May 26, 1964 V. J. LUNDELL 3,134,344
WAFERING MACHINE EJECTING MECHANISM
Filed April 1, 1963 2 Sheets-Sheet 1

INVENTOR.
VERNON J. LUNDELL
BY
Wolfe, Hubbard, Voit & Osann
ATTORNEYS.

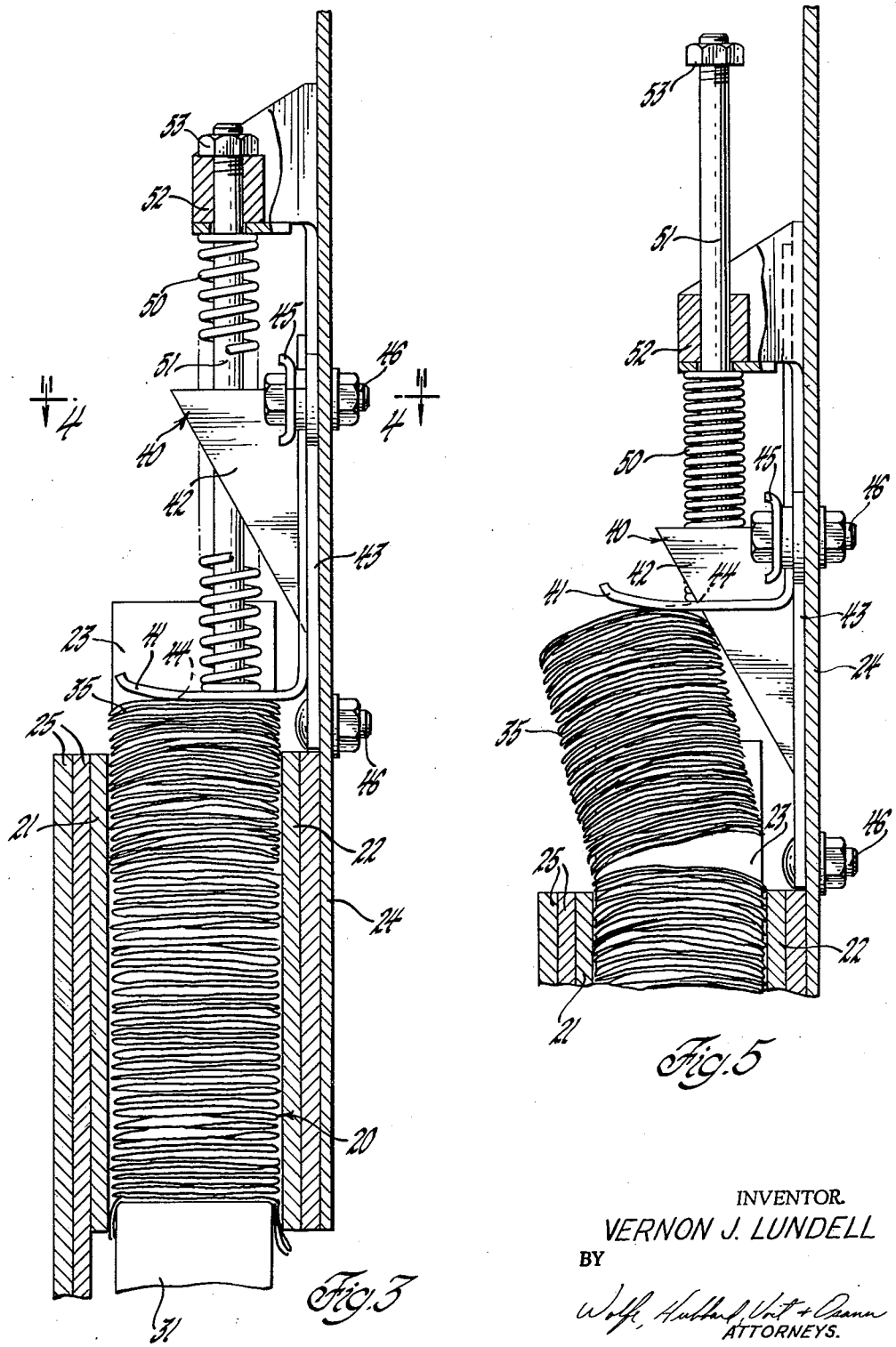

United States Patent Office 3,134,344
Patented May 26, 1964

3,134,344
WAFERING MACHINE EJECTING MECHANISM
Vernon J. Lundell, Cherokee, Iowa, assignor to Massey-Ferguson Services N.V., Netherlands Antilles, a corporation of the Netherlands Antilles
Filed Apr. 1, 1963, Ser. No. 269,681
2 Claims. (Cl. 107—14)

This invention relates generally to agricultural wafer forming machines and more particularly concerns an ejector construction for such machines.

Forage crops such as hay have traditionally been gathered into bales for convenience in handling and storage. Recently, however, practical wafering machines have come into use which form forage crop material into compacted wafers or pellets, a system having substantial advantages over the traditional baling technique. An efficient type of wafering machine is disclosed in my copending application, Serial No. 153,599, filed November 20, 1961 in which finely divided crop material is forced through die cells in a kind of extrusion process. The compacted extruded crop material is broken off into discrete segments which define the wafers.

The present invention lies in an ejecting mechanism for wafering machines of the above type which firmly holds the extruded crop material until it is broken into discrete wafers whereupon a positive ejection force is exerted assuring clean separation of each wafer from the extruded mass.

An example of the inventive wafer ejecting mechanism is shown in the accompanying drawings, in which:

FIG. 3 is a greatly enlarged fragmentary section showing a portion of the structure appearing in FIG. 1;

FIG. 5 is similar to FIG. 3 and shows the parts in alternate operating positions.

Figures 1, 2, 4:
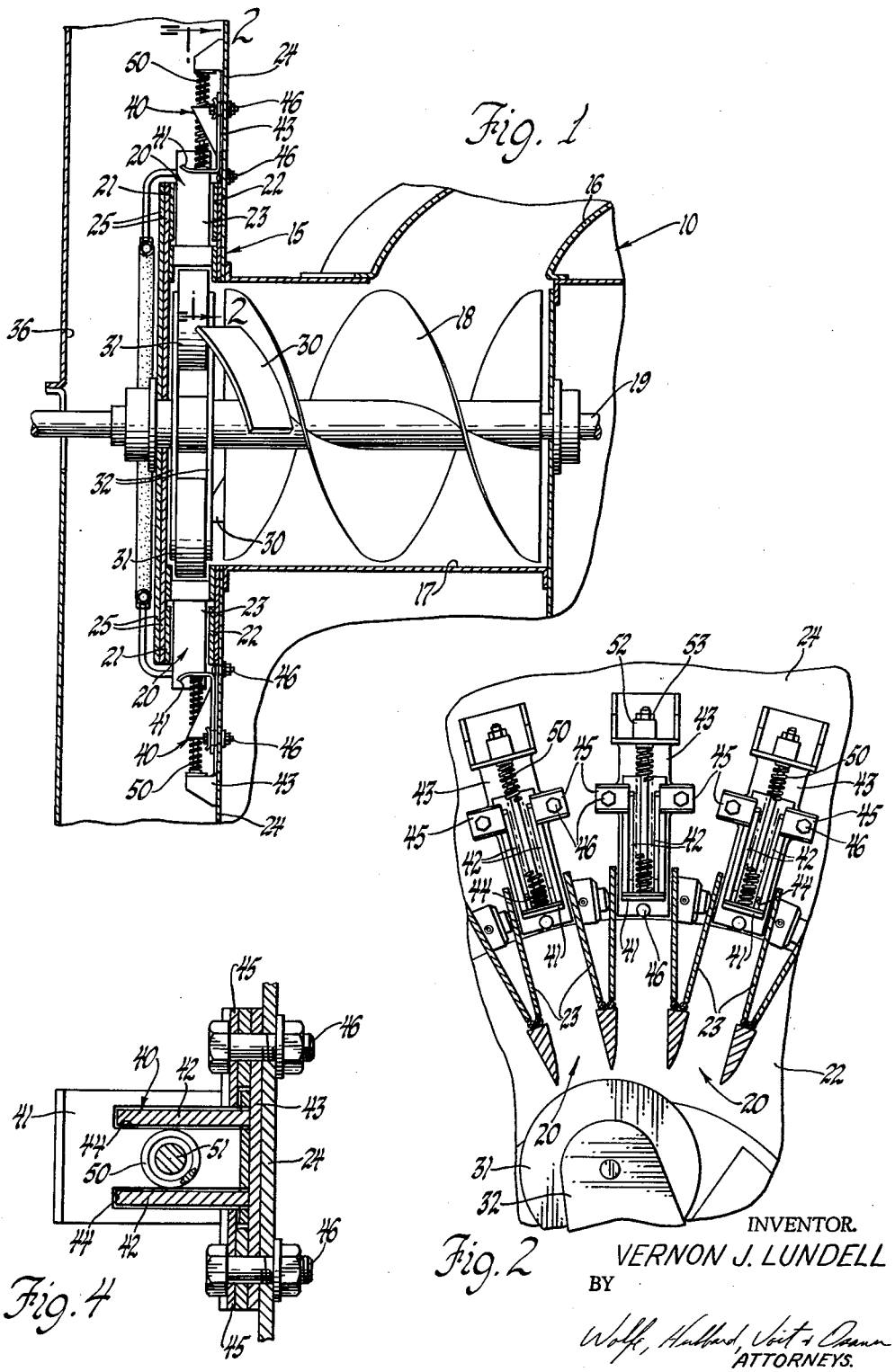
FIGURE 1 is a fragmentary section of that portion of a wafering machine which includes the wafering mechanism and in which the present invention is embodied.
FIG. 2 is an enlarged fragmentary section taken approximately along the line 2—2 in FIG. 1.
FIG. 4 is a fragmentary section taken approximately along the line 4—4 in FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a fragment of a wafering machine 10 embodying a wafering mechanism 15. The machine 10 includes a hood 16 through which particulated crop material is delivered to a hopper 17. An auger conveyor 18 mounted on a main shaft 19 feeds material through the hopper 17 toward the wafering mechanism 15. The mechanism 15 comprises an annular array of outwardly opening die cells 20 defined by annular side plates 21 and 22 having interposed, generally radially oriented partitions 23. The side plates 21, 22 and the intermediate partitions 23 are sandwiched between a frame wall 24 and a pair of circular wall plates 25.

The crop material moved toward the wafering mechanism 15 by the conveyor 18 is delivered radially outward toward the die cells 20 by vanes 30, of which only one is shown, mounted on the conveyor 18. The finely divided crop material is then forced into and extruded through the die cells 20 by press rolls 31 which are journalled on arms 32 that are mounted on the shaft 19. As more and more crop material is packed into the die cells 20 by the rollers 31, compacted crop material 35 (see FIG. 3) is extruded from the die openings.

Pursuant to the invention, the extruded crop material from each die cell 20 is separated into discrete wafers and ejected into a chamber 36 by an ejector mechanism, there being one mechanism for each of the die cells, which includes a camming ramp 40 for deflecting and breaking off segments of the extruded material and a biased pressing shoe 41 which firmly holds the material as it is extruded and positively ejects the wafers when they are deflected by the ramp 40. Since the ramp 40 and pressing shoe 41 of the ejector mechanism for each of the cells is identical, they will be described in the singular.

The ramp 40 is defined by a pair of spaced, angled plates 42 secured to a mounting plate 43. The shoe 41 is generally L-shaped and formed with elongated slots 44 which receive the ramp plates 42 so that the shoe 41 is slidable along the frame plate 43. Retainer tabs 45 hold the shoe 41 against the frame plate 43, and a plurality of bolts 46 secure the entire assembly to the frame wall 24.

The shoe 41 is urged toward the die cell 20 by a firm spring 50 that surrounds a rod 51 secured to the shoe 41 and slidably fitted through a collar 52 mounted on the frame plate 43. The spring 50 is compressed between the shoe 41 and the portion of the frame plate 43 which holds the collar 52.

In operation, the shoe 41 is urged firmly downward just above the opening of the die cell 20 by the spring 50, the limit position being established by a nut 53 threaded on the rod 51 coming into abutment with the collar 52. Extrusion of the compacted material 35 is resisted by the force exerted through the shoe 41 by the spring 50 so that the material is held firmly.

Upon continued extrusion of the material, the side of the ejected mass strikes the ramp 40 which eventually deflects and breaks off a segment into a discrete wafer or pellet (see FIG. 5). It will be appreciated that as soon as the ramp 40 tilts the separated wafer with respect to the line of force exerted by the spring 50 through the shoe 41, the shoe will exert a positive ejecting force tending to throw the separated wafer laterally into the chamber 36. When a wafer is ejected and cleared from the end of the die cell 20, the shoe 41 is returned to its starting position and the operation is repeated.

The embodiments of the invention in which an exclusive property or privilege is claimed are defined as follows:

1. An ejector mechanism for wafering machines having a die cell from which compacted crop material is extruded adjacent a frame, characterized by having a camming ramp on said frame, the face of said camming ramp extending at an angle to the extended longitudinal axis of said die cell for deflecting and breaking off segments of extruded material into wafers and a biased pressing shoe mounted on said frame in axial alignment with said die cell and adapted to move in a substantially straight line along the extended longitudinal axis of the die cell, said pressing shoe also being adapted to ride on the end of the extruded material so as to firmly hold the material and positively eject wafers when they are tilted by said ramp at an angle to the force of said shoe.

2. The ejector mechanism of claim 1 having a pair of spaced, angled plates defining said ramp and said shoe being slidably mounted on said frame and having elongated slots for receiving said plates.

References Cited in the file of this patent

UNITED STATES PATENTS

| | | |
|---|---|---|
| 1,010,175 | Pooley | Nov. 28, 1911 |
| 1,881,171 | Cooley | Oct. 4, 1932 |
| 2,384,163 | Flowers | Sept. 4, 1945 |
| 2,427,644 | Field | Sept. 16, 1947 |
| 2,642,643 | Montague | June 23, 1953 |
| 2,870,481 | Bonnafoux | Jan. 27, 1959 |
| 3,070,006 | Raney et al. | Dec. 25, 1962 |
| 3,084,620 | Gibbons | Apr. 9, 1963 |

FOREIGN PATENTS

| | | |
|---|---|---|
| 1,250,174 | France | Nov. 28, 1960 |